United States Patent
Kharvar et al.

(10) Patent No.: US 11,696,134 B2
(45) Date of Patent: Jul. 4, 2023

(54) SECURE PATH DISCOVERY IN A MESH NETWORK

(71) Applicant: QUALCOMM Incorporated, San Diego, CA (US)

(72) Inventors: Chirag Manojkumar Kharvar, Bangalore (IN); Skanda Kumar Kaipu Narahari, Banashankari 3rd Stage (IN); Sourabh Jana, Bangalore (IN)

(73) Assignee: QUALCOMM INCORPORATED, San Diego, CA (US)

( * ) Notice: Subject to any disclaimer, the term of this patent is extended or adjusted under 35 U.S.C. 154(b) by 504 days.

(21) Appl. No.: 16/946,635

(22) Filed: Jun. 30, 2020

(65) Prior Publication Data
US 2021/0037387 A1 Feb. 4, 2021

(30) Foreign Application Priority Data
Aug. 2, 2019 (IN) .............................. 201941031298

(51) Int. Cl.
*H04W 12/102* (2021.01)
*H04L 9/08* (2006.01)
(Continued)

(52) U.S. Cl.
CPC ......... *H04W 12/102* (2021.01); *H04L 9/0869* (2013.01); *H04L 9/3226* (2013.01);
(Continued)

(58) Field of Classification Search
CPC ............. H04W 12/102; H04W 12/106; H04W 12/121; H04W 40/22; H04W 40/246; H04L 9/0869; H04L 9/3226; H04L 9/3242
See application file for complete search history.

(56) References Cited

U.S. PATENT DOCUMENTS

| 4,652,990 A | * | 3/1987 | Pailen | ................... G06F 21/123 380/46 |
| 8,745,710 B1 | * | 6/2014 | Roth | ..................... H04W 12/06 726/6 |

(Continued)

FOREIGN PATENT DOCUMENTS

| WO | 2015065907 A1 | 5/2015 |
| WO | 2015184385 A1 | 12/2015 |

OTHER PUBLICATIONS

Qazi, S., "Securing Wireless Mesh Networks with Ticket-Based Authentication", Dec. 2008, 2nd International Conference on Signal Processing and Communication Systems, pp. 1-10 (Year: 2008).*

(Continued)

*Primary Examiner* — Kenneth W Chang
(74) *Attorney, Agent, or Firm* — Qualcomm Incorporated; Kevin T. Cheatham

(57) ABSTRACT

A method for secure path discovery in a mesh network at a destination device is disclosed. The method includes receiving a path discovery request from an originator device and selecting a path selection in response to the path discovery request. The method also includes transmitting the path selection to the originator device and receiving a random seed from a provisioner device. The method also includes generating an authentication code based on the random seed, transmitting an authentication code message to an originator device and receiving communications from the originator device only if the originator device receives a verification response message from the provisioner device which confirms that the destination device has been verified.

34 Claims, 8 Drawing Sheets

(51) Int. Cl.
  *H04L 9/32*      (2006.01)
  *H04W 12/106*    (2021.01)
  *H04W 12/121*    (2021.01)

(52) U.S. Cl.
  CPC ......... *H04L 9/3242* (2013.01); *H04W 12/106* (2021.01); *H04W 12/121* (2021.01)

(56) References Cited

U.S. PATENT DOCUMENTS

| | | | | |
|---|---|---|---|---|
| 2006/0256961 | A1* | 11/2006 | Brainard | G06F 21/31 380/44 |
| 2008/0072301 | A1* | 3/2008 | Chia | H04L 63/0815 726/8 |
| 2015/0350906 | A1* | 12/2015 | Patil | H04W 12/50 713/168 |
| 2018/0041247 | A1* | 2/2018 | Zakaria | H04B 3/542 |
| 2018/0332047 | A1* | 11/2018 | Shah | H04L 63/0464 |

OTHER PUBLICATIONS

"14. MLME Mesh Procedures 14.1 Mesh STA Dependencies", IEEE Draft, REVMD_CL_14.FM, IEEE-SA, Piscataway, NJ USA, vol. 802.11m Drafts, 802.11 Drafts, 802.11m Drafts, No. D2.3, Jul. 12, 2019 (Jul. 12, 2019), pp. 1-115, XP068152281, Retrieved from the Internet: URL: http://www.ieee802.org/11/private/Draft_Standards/11md/Draft%20P802.11REVmd_D2.3.rtfs.zip REVmd_CI_14.fm.rtf [retrieved on Jul. 12, 2019] Sections 14.5, 14.6, 14.10.
International Search Report and Written Opinion—PCT/US2020/070238—ISA/EPO—dated Oct. 21, 2020.

* cited by examiner

SECURE PATH DISCOVERY IN A MESH NETWORK

CLAIM OF PRIORITY

The present Application for Patent claims priority to Indian Application No. 201941031298 entitled "SECURE PATH DISCOVERY IN A MESH NETWORK" filed Aug. 2, 2019, and assigned to the assignee hereof and hereby expressly incorporated by reference herein.

TECHNICAL FIELD

The various aspects described herein generally relate to wireless communications, and in particular, to secure path discovery in a mesh network.

BACKGROUND

All wireless networking technologies generally have a limited range. However, there are many environments in which devices that are otherwise outside communication range of each other may need to communicate using a reliable low-power wireless technology. For example, the Internet of Things (IoT) is based on the idea that everyday devices can be read, recognized, located, addressed, and otherwise controlled via an IoT communications network (e.g., an ad-hoc system or the Internet).

One way to address issues that arise when devices are outside a maximum communication range of each other is to implement a mesh network which has a topology where all devices can communicate with each other directly or indirectly. For example, two devices that are in radio range can communicate directly, whereas communication with devices located outside radio range of each other can be achieved via one or more intermediate "relay" nodes. Mesh networks can therefore offer multiple paths to route a message from an originator node to a destination node resulting in greater reliability relative to other networks that tend to flow all traffic through a central hub (e.g., a router or gateway).

A wireless mesh network can generally refer to a network in which various devices or "nodes" have the ability to receive and act upon messages, in addition, to having the ability to repeat or relay the messages to surrounding devices or nodes that are within radio range. The mesh architecture can therefore extend the effective radio range associated with whatever wireless technology is used to convey the messages, and thereby can be used to implement the IoT and other suitable use cases that are built at least in part on wireless communications. The efficiency and security of a mesh network can be improved by the use of Directed Forwarding which enables an originator node to communicate information to a specific destination node. Accordingly, there exists a need to ensure that communications between nodes are secure from third party attackers.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect of the present disclosure, a method for secure path discovery in a mesh network at a destination device is described. The method includes receiving a path discovery request from an originator device and selecting a path selection in response to the path discovery request. The method also includes transmitting the path selection to the originator device and receiving a random seed from a provisioner device. The method also includes generating an authentication code based on the random seed and transmitting an authentication code message to an originator device. The method also includes receiving communications from the originator device only if the originator device receives a verification response message from the provisioner device which confirms that the destination device has been verified. The destination device can increment the random seed on each new secure path discovery. In one example, the random seed is 4 octets.

The provisioner device can send a custom configuration message to the destination device which includes a new random seed when the provisioner device determines that a large portion of the random seed sequences have been used. The provisioner device can update the random seed for at least one device on a periodic basis. The provisioner device can send a new random seed to a device based on a request from the device.

In one implementation, the destination device generates the authentication code by generating an encrypted hash value based on the random seed, device key of the destination device, and a payload. The authentication code message includes the authentication code, an AuthMic (authentication message integrity check), and the destination device unicast address. In one example, the authentication code is 4 octets.

In one implementation, the provisioner device performs the verification by decrypting the value of the authentication code and determining if the value of the AuthMic sent by the destination device matches the value of the AuthMic generated by the provisioner device. If the verification response message confirms that the destination device has failed to be verified, the originator device blocks the destination device from receiving any communications. The originator device reports to the provisioner device that the destination device is a third party attacker.

In another aspect of the present disclosure, a destination device for secure path discovery in a mesh network is described. The destination device includes a memory and at least one processor coupled to the memory and configured to receiving a path discovery request from an originator device and selecting a path selection in response to the path discovery request. The destination device transmitting the path selection to the originator device and receiving a random seed from a provisioner device. The destination device generating an authentication code based on the random seed; and transmitting an authentication code message to an originator device. The destination device receiving communications from the originator device only if the originator device receives a verification response message from the provisioner device which confirms that the destination device has been verified.

In another aspect of the present disclosure, a destination device for secure path discovery in a mesh network is described. The destination device includes means for receiving a path discovery request from an originator device and means for selecting a path selection in response to the path discovery request. The destination device also includes means for transmitting the path selection to the originator device and means for receiving a random seed from a provisioner device. The destination device also includes means for generating an authentication code based on the random seed and means for transmitting an authentication code message to an originator device. The destination device also includes means for receiving communications from the originator device only if the originator device receives a verification response message from the provisioner device which confirms that the destination device has been verified.

In another aspect of the present disclosure, a non-transitory computer-readable medium storing code for secure path discovery at a destination device is described. The code comprising instructions executable by a processor to receiving a path discovery request from an originator device, selecting a path selection in response to the path discovery request, transmitting the path selection to the originator device, receiving a random seed from a provisioner device, generating an authentication code based on the random seed, transmitting an authentication code message to an originator device, and receiving communications from the originator device only if the originator device receives a verification response message from the provisioner device which confirms that the destination device has been verified.

In an aspect of the present disclosure, a method for secure path discovery in a mesh network at an originator device is described. The method includes sending a path discovery request to a destination device and receiving a path selection from the destination device. The method also includes receiving an authentication code message from the destination device and transmitting a verification request message to a provisioner device. The method also includes receiving a verification response message from the provisioner device and sending communications to the destination device only if the verification response message from the provisioner device confirms that the destination device has been verified.

The authentication code message includes an authentication code, an AuthMic (authentication message integrity check), and the destination device unicast address. In one implementation, the destination device generates the authentication code by generating an encrypted hash value based on a random seed, device key of the destination device, and a payload. In one implementation, the provisioner device performs the verification by decrypting the value of the authentication code and determining if the value of the AuthMic sent by the destination device matches the value of the AuthMic generated by the provisioner device. If the verification response message confirms that the destination device has failed to be verified, the originator device blocks the destination device from receiving any communications. The originator device reports to the provisioner device that the destination device is a third party attacker.

In another aspect of the present disclosure, an originator device for secure path discovery in a mesh network is described. The originator device includes a memory and at least one processor coupled to the memory and configured to sending a path discovery request to a destination device, receiving a path selection from the destination device, receiving an authentication code message from the destination device, transmitting a verification request message to a provisioner device, receiving a verification response message from the provisioner device, and sending communications to the destination device only if the verification response message from the provisioner device confirms that the destination device has been verified.

In another aspect of the present disclosure, an originator device for secure path discovery in a mesh network is described. The originator device includes a means for sending a path discovery request to a destination device and means for receiving a path selection from the destination device. The originator device also includes means for receiving an authentication code message from the destination device and means for transmitting a verification request message to a provisioner device. The originator device also includes means for receiving a verification response message from the provisioner device and means for sending communications to the destination device only if the verification response message from the provisioner device confirms that the destination device has been verified.

In another aspect of the present disclosure, a non-transitory computer-readable medium storing code for secure path discovery at an originator device is described. The code comprising instructions executable by a processor to sending a path discovery request to a destination device, receiving a path selection from the destination device, receiving an authentication code message from the destination device, transmitting a verification request message to a provisioner device, receiving a verification response message from the provisioner device, and sending communications to the destination device only if the verification response message from the provisioner device confirms that the destination device has been verified.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
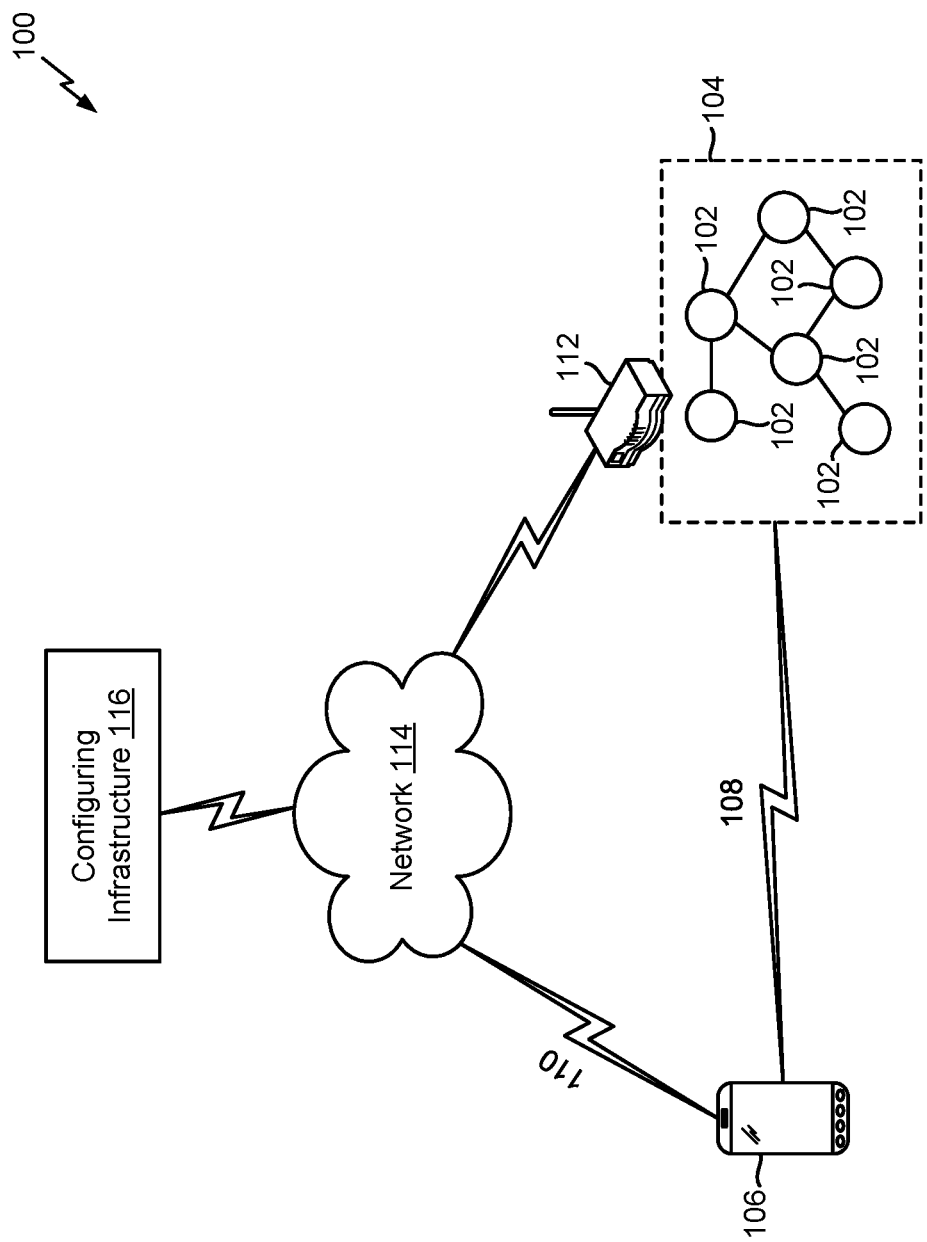
FIG. 1 is a block diagram illustrating one configuration of a wireless mesh network.

Aspects of the disclosure are provided in the following description and related drawings directed to various examples provided for illustration purposes. Alternate aspects can be devised without departing from the scope of the disclosure. Additionally, well-known aspects of the disclosure may not be described in detail or may be omitted so as not to obscure more relevant details.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including,"

as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the term "node" refers to a mobile or stationary device that is a member of a wireless mesh network. A node may be a cellular telephone, a "smart phone," a personal or mobile multimedia player, a personal data assistant, a laptop computer, a desktop computer, a tablet computer, a wireless gaming controller, an IoT device (e.g., a "smart" thermostat, refrigerator, microwave, speaker system, meter, etc.), and similar devices with a programmable processor, memory, and circuitry to connect to and communicate over a radio access network (RAN) that implements a particular radio access technology (RAT) over a wired network, over a wireless local area network (WLAN) (e.g., based on IEEE 802.11, etc.), and/or with other devices via a direct device-to-device (D2D) or peer-to-peer (P2P) connection (e.g., a Bluetooth connection).

The efficiency of a mesh network can be improved by the use of Directed Forwarding which enables an originator node to communicate information to a specific destination node. When Directed Forwarding is implemented in a mesh network, an originator node uses a path discovery technique to determine the best path for communicating with a destination node. Path discovery generally involves the originator node sending a path discovery message to all nodes that are between the originator node and the destination node referred to as intermediate nodes. The nodes respond to the originator node with specific information that the originator node can use to determine which communication path is the most efficient to communicate with the destination node. The problem with path discovery is that nodes are vulnerable to third party attackers using man in the middle, spoofing, and jammer attacks to intercept communications. Accordingly, there exists a need for secure path discovery in a mesh network.

FIG. 1 is a block diagram illustrating one configuration of a wireless mesh network. The example wireless mesh network 100 can include various nodes 102, which can optionally be organized as a group 104, a controller 106 (e.g., a mobile device), a gateway 112, and a configuring infrastructure 116 in communication via a network "cloud" 114 (e.g., the Internet). Although the controller 106 and the gateway 112 are shown as elements separate from the nodes 102, the controller 106 and/or the gateway 112 can be included among the nodes 102. In general, the nodes 102 can be the basic building blocks of the wireless mesh network 100. The nodes 102 can be any suitable device that can be configured to send, receive, and relay messages to surrounding nodes 102 (i.e., devices). Message communication among the nodes 102 can generally be based on broadcast messages which can be transmitted via one or more wireless channels.

The controller 106 (which can also be referred to as a provisioner device) can be configured to establish a wireless connection 108 with the nodes 102. The controller 106 can use a wireless radio to communicate with the nodes 102 in the wireless mesh network 100. The controller 106 can have an additional communication path 110 to the wireless mesh network 100. For example, the controller 106 can use a configuring application to communicate with the configuring infrastructure 116 via the additional communication path 110 (e.g., via a web console or service). The configuring infrastructure 116 can service configuration commands received from the controller 106 (e.g., to securely distribute a network key to a new node 102, to program a particular node 102 to be within the group 104 or another group, etc.). The gateway 112 (e.g., an access point) can link the various nodes 102 to the network 114 and allow command and control over a local area network (LAN) and/or wireless LAN (WLAN) to which the gateway 112 is connected. Like other elements in the wireless mesh network 100, the gateway 112 can also use a wireless radio to communicate with the various nodes 102 via a wireless channel. The wireless mesh network 100 can enable the nodes 102 to send, receive, and/or relay messages (e.g., command and control operations), which can originate at one or more of the nodes 102 and/or be received from the controller 106 via the wireless connection 108 or from the gateway 112 via the additional communication path 110 between the controller 106 and the nodes 102.

The nodes 102, the controller 106, and the gateway 112 can be configured to communicate with one another via a wireless mesh protocol, which can generally enable devices to send, receive, and relay messages to surrounding devices located within radio range, thus forming an ad-hoc mesh network. For example, message communication can be based on broadcast messages transmitted and received via one or more wireless channels (e.g., Bluetooth broadcast channel) where each node 102 that receives a broadcast message can accept and forward the message to other nodes 102 within radio range. In this manner, the range over which the nodes 102 can communicate can be easily extended, as one or more intermediate nodes 102 can be used to relay a message to another node 102 that is otherwise located outside radio range of the originating node 102. The wireless mesh protocol can enable the wireless mesh network 100 to be easily extended to accommodate new devices which can also increase the geographic coverage of the wireless mesh network 100 depending on device placement. The wireless mesh protocol can be used to support various different use cases that are built, at least in part, on point-to-point, point-to-multipoint, and/or other suitable wireless communications.

Figure 2:
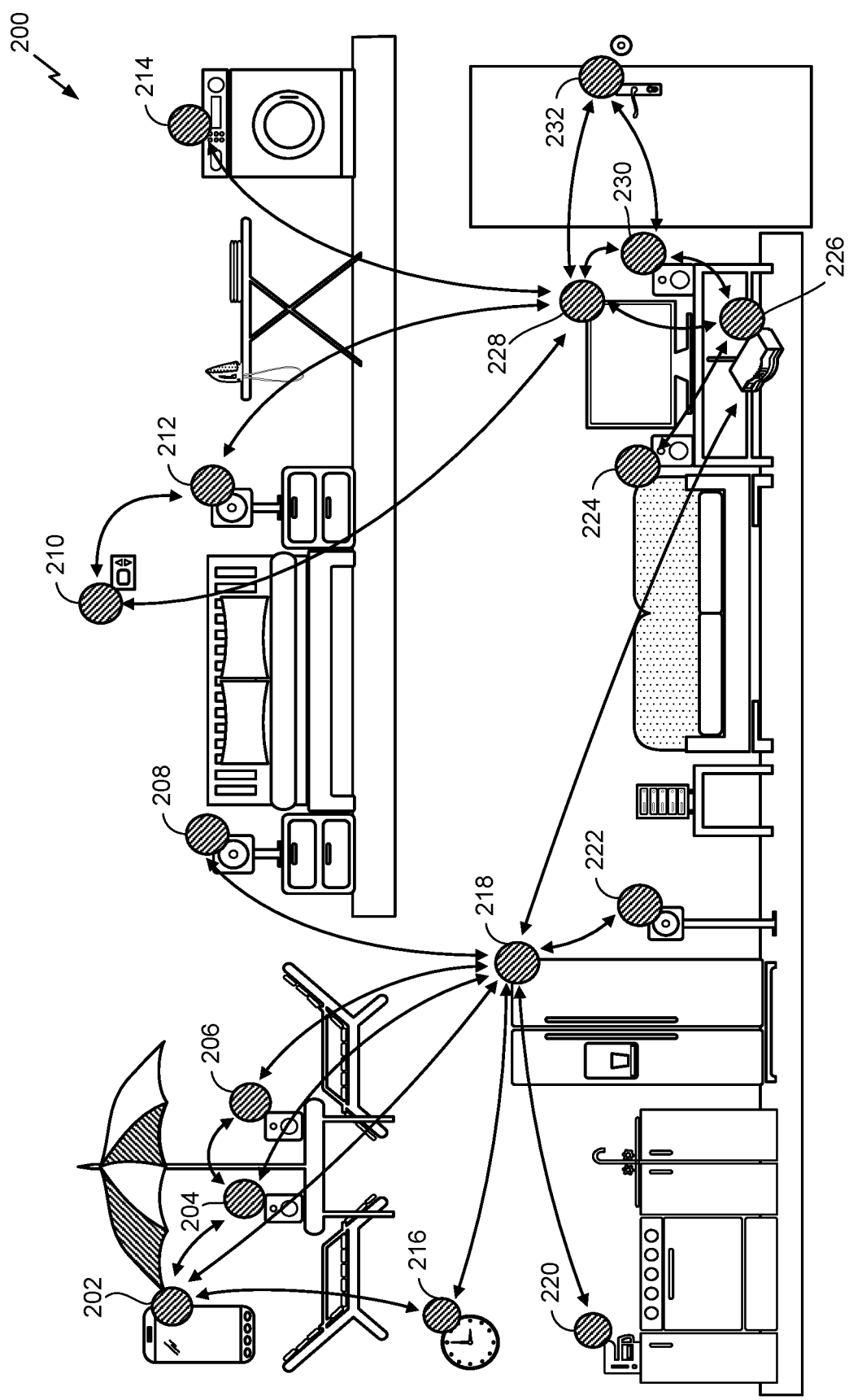
FIG. 2 is a block diagram illustrating one configuration of a wireless mesh network implemented in an example residential environment.

FIG. 2 is a block diagram illustrating one configuration of a wireless mesh network implemented in an example residential environment. In the environment 200 shown in FIG. 2, the wireless mesh network supports a home automation or an IoT use case, where home appliances, lights, electrical switches, thermostats, etc. can form a wireless mesh network and be controlled via the wireless mesh protocol, either directly using one or more user devices or indirectly via a gateway device in communication with the one or more user devices (e.g., a smartphone, a laptop computer, etc.). For example, the residential environment 200 as shown in FIG. 2 includes a smartphone 202 (which can correspond to controller 106), outdoor speakers 204 and 206, bedroom speakers 208 and 212, a thermostat 210, a laundry machine 214, a clock 216, a refrigerator 218, a coffee machine 220, a kitchen speaker 222, family room speakers 224 and 230, a television 228, an electronic lock 232, and a home gateway device 226 (which can correspond to gateway 112 in FIG. 1). The various devices can communicate with other devices within sufficient range (e.g., via broadcast messages) and the messages can be received and relayed as appropriate to ensure that the messages reach the intended destination. For example, a user can press a button on the smartphone 202 to engage the electronic lock 232 which is located outside radio range from the smartphone 202. However, the smartphone 202 is within radio range from the outdoor speakers 204 and 206, the clock 216, and the refrigerator 218. The smartphone 202 can broadcast a message containing a command to engage the electronic lock 232. The outdoor speakers 204 and 206, the clock 216, and the refrigerator 218 can each relay the message until the message eventually reaches the electronic lock 232.

Bluetooth mesh uses four types of nodes including Relay Nodes, Low Power Nodes (LPNs), Proxy Nodes, and Friend Nodes. Relay Nodes receive and forward messages across the mesh network. Relay Nodes generally remain in an active or awake mode which significantly increases power consumption. This is not a disadvantage for standard powered applications (where the node is hardwired or plugged in to a power source connected to a power grid as known as wall power, AC power, domestic power) such as smart lighting. This is a problem for battery powered nodes such as switches that are incorporated into the mesh network. Due to their application, Relay Nodes generally operate on standard power (i.e., non-battery power).

LPNs use the general power-saving characteristics of BLE (e.g., remaining in a sleep state for long periods) and can therefore operate for long periods on battery power. Each LPN is connected to a standard powered Friend Node, which remains in an active, or awake, mode and caches any messages directed to the LPN. When the LPN enters a receive mode (according to a predetermined schedule), it polls the Friend Node for any messages stored in the Friend Node's cache. The Friend Node sends all of the cached messages to the LPN (referred to as response messages), which operates as instructed and then returns to a power-saving sleep mode. A Friend node can be friends with multiple LPN's.

Proxy Nodes can allow for legacy devices to operate on a mesh network. For example, when a consumer wishes to use a legacy smartphone to control smart lighting via the mesh network. Proxy nodes will generally be a legacy implementation which does not have support for sending advertisement packets by any profile. Proxy nodes will have Generic Attribute Profile (GATT) connection support. This GATT bearer exists for legacy devices. The Proxy nodes which only have GATT support will create a proxy connection with Proxy servers. Proxy servers have both GATT and advertisement bearer support. When Proxy nodes want to send communications to other nodes, the Proxy nodes send communications over a GATT bearer to a Proxy server. The Proxy servers will relay the communications on advertisement bearers and GATT bearers on to other nodes.

In reference to FIG. 2, the thermostat 210 (battery powered) can be an example of an LPN and the bedroom speaker 212 and/or the television 228 (if standard powered) can be examples of Friend Nodes. In another example, the clock 216 (battery powered) can be an LPN and the refrigerator 218 (standard powered) can be a Friend Node. In another example, the refrigerator 218, the television 228, and the laundry machine 214, for example, can be Relay Nodes, as they are all standard powered. The outdoor speakers 204 and 206, the bedroom speaker 212, and the family room speaker 250 can also be Relay Nodes even if not standard powered. Each node in a wireless mesh network (e.g., wireless mesh network 100) has its own device key (a unique private device-specific key, referred to as a "DevKey" in Bluetooth mesh) known only to itself and the provisioner device.

Each node in the wireless mesh network shares a network key (a public network-specific key, referred to as a "NetKey" in Bluetooth mesh). Before a new node can take part in routine mesh operations, it is "provisioned" (i.e., onboarded to the mesh network) by the provisioner device through a process called "provisioning." The provisioner device is a trusted device with access to all of the nodes in the mesh network. For example, the provisioner device may be the controller 106 in FIG. 1. The new node is assigned an address (e.g., an Internet Protocol (IP) address), along with the network and device keys. After provisioning, the device key is used to establish a secure channel with the provisioner device to configure the new node.

Provisioning is generally accomplished using an application installed on the provisioner device (e.g., controller 106). The Bluetooth mesh provisioning procedure uses the Elliptic Curve Diffie-Hellman (ECDH) key agreement protocol and a 256-bit Elliptic Curve Cryptography (ECC) public-private key exchange to distribute provisioning data. ECDH is an anonymous key agreement protocol that allows two parties, each having an ECC public-private key pair, to establish a shared secret over an insecure channel. ECDH's purpose in Bluetooth mesh provisioning is to allow the creation of a secure link between the provisioner device and the unprovisioned device. It uses public and private keys to distribute a symmetric secret key that the two devices can then use for encryption and decryption of subsequent messages.

The provisioning procedure is intended to accomplish two tasks. The first is to authenticate the unprovisioned device. In a Bluetooth mesh network, for example, there may be several, dozens, or hundreds of devices in a small space. Authentication is performed to make sure that the device the provisioner device interacts with is the device the user wants to provision. The second is to build a secure link with the unprovisioned device to share information with it. At the end of the process, the unprovisioned device will be a node in the Bluetooth mesh network.

Figure 3:
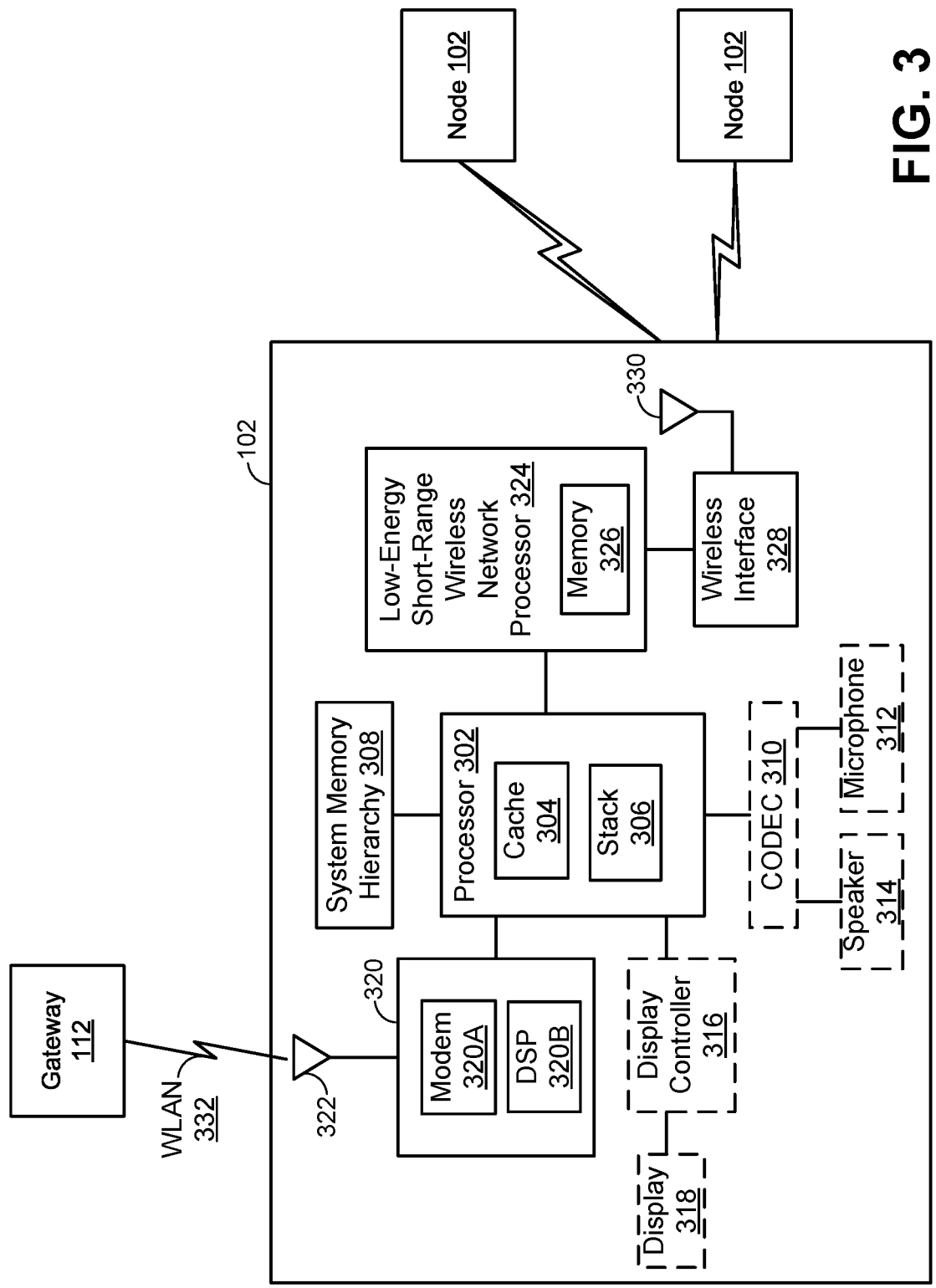
FIG. 3 is a block diagram illustrating one configuration of a node that can operate within a wireless mesh network.

FIG. 3 is a block diagram illustrating one configuration of a node 102 that can operate within a wireless mesh network. Processor 302 for the node 102 runs applications that cause the node 102 to perform the functionality described in this disclosure and includes a cache memory 304 along with a system memory hierarchy 308. The system memory hierarchy 308 acts as an interface to store and retrieve data and instructions from off-chip memory. The system memory hierarchy 308 can include various volatile and non-volatile memory systems.

The node 102 is capable of interfacing with wireless local area networks by way of a transceiver 320 and an antenna 322. The transceiver 320 includes a modem 320A and a digital signal processor (DSP) 320B, although in practice other kinds of modules can be employed, all or some such modules can be integrated on a single chip, and some of the modules can be integrated with the processor 302. In one implementation, the node 102 has a WLAN link 332 to the gateway 112 which can provide access to the network 114 (not shown).

The processor 302 can implement a low-energy short-range wireless network protocol stack 306 such as a Bluetooth Low Energy (BLE) protocol stack or a Bluetooth mesh protocol stack. The instructions for performing some or all of the low-energy short-range wireless network protocol stack 306 are stored in the system memory hierarchy 308. However, in the example of FIG. 3, a separate chip or an embedded hardware core, shown as a low-energy short-range wireless network processor 324, implements the portions of the low-energy short-range wireless network protocol stack 306 to perform the low-energy short-range wireless network operations. The low-energy short-range wireless network processor 324 includes a memory 326, shown as an on-chip memory, although the memory 326 can be part of a memory hierarchy in which some memory also resides off-chip. The wireless interface 328 provides an interface to the antenna 330 suitable for operating in the designated frequency spectrum utilized by the low-energy short-range wireless network. Communication can be made to any number of low-energy short-range wireless network capable devices such as one or more other nodes 102. The instructions for implementing some or all of the low-energy short-range wireless network operations described in this disclosure can be stored in memory 326. The memory 326 can be referred to as a non-transitory computer-readable medium.

The node 102 includes both a transceiver 320 that permits the node 102 to act as an access terminal to the gateway 112 and a low-energy short-range wireless network processor 324 and wireless interface 328 that together permit the node 102 to act as a low-energy mesh network node in a low-energy mesh network such as wireless mesh network 100. For example, the node 102 can receive information for another node 102 from the gateway 112 via the transceiver 320. The node 102 can establish a connection with all downlink nodes 102 and transmit the information in one or more data packets to the downlink nodes 102 using the low-energy short-range wireless network processor 324 and wireless interface 328.

The node 102 can optionally include a user interface. The node 102 can include a CODEC (Coder-Decoder) 310 for interfacing with a microphone 312 and a speaker 314. A display controller 316 provides an interface to a display 318 so that the user can interact with the node 102.

In one implementation, the low-energy short-range wireless network processor 324, as directed by instructions stored in memory 326, can cause the node 102 to perform the operations in this disclosure. For example, the low-energy short-range wireless network processor 324, the memory 326, and the wireless interface 328 can all be used cooperatively to load, store, and execute the various operations allowing the logic to perform these operations to be distributed over various elements. In another example, the functionality could be incorporated into one discrete component (e.g., the low-energy short-range wireless network processor 324).

Nodes 102 in a mesh network (e.g., wireless mesh network 100) can communicate with each other using various wireless communication protocols, such as Zigbee, Thread, Bluetooth, Bluetooth Low Energy, magnetic communications, near-field communication (NFC), near field magnetic induction (NFMI) communication, near ultra-low energy field (NULEF) communication, Wi-Fi (802.11), and related wireless communication protocols. The Bluetooth protocol used for mesh networks is referred to as "Bluetooth mesh" and is described in various publicly available specifications from the Bluetooth Special Interest Group (SIG). Bluetooth mesh builds on the Bluetooth Low Energy (BLE) protocol, which is described in various publicly available specifications from the Bluetooth SIG.

Figure 4:
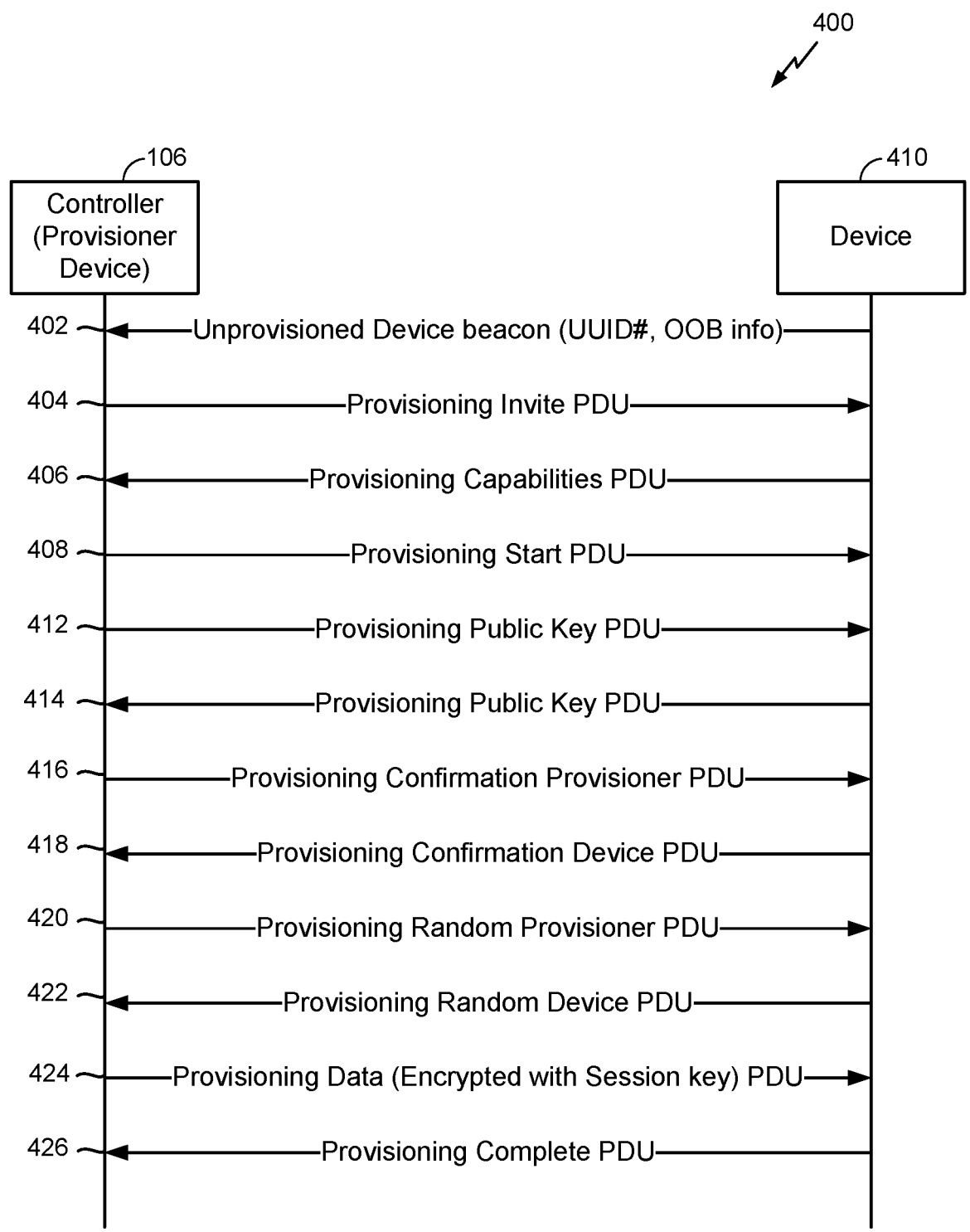
FIG. 4 is a block diagram illustrating the controller (acting as a provisioner device) provisioning an unprovisioned device in a wireless mesh network.

FIG. 4 is a block diagram illustrating the controller 106 (acting as a provisioner device) provisioning an unprovisioned device 410 in a wireless mesh network 100. The device 410 can be also be referenced in FIG. 1 as a node 102. The controller 106 and the device 410 may communicate with each other according to the Bluetooth mesh protocol using their respective low-energy short-range wireless network processors 324 and wireless interfaces 328.

At 402, the device 410 indicates its availability to be provisioned by transmitting an unprovisioned device beacon in one or more advertising packets. The user may need to start the device 410 advertising in this way by, for example, pressing a combination of buttons on the device 410 or holding down a button on the device 410 for a certain length of time. The beacon message may include the Universally Unique Identifier (UUID) of the device 410.

At 404, the controller 106 sends an invitation to the device 410 in the form of a Provisioning Invite Protocol Data Unit (PDU). At 406, the device 410 responds with information about itself in a Provisioning Capabilities PDU. The Provisioning Capabilities PDU may include the number of elements the device 410 supports, the set of security algorithms supported (e.g., ECDH), the availability of its public key using an Out-of-Band (OOB) method, the ability for the device 410 to output a value to the user (e.g., display screen LED(s), speaker(s), etc.), and/or the ability for the device 410 to receive a value inputted by the user (e.g., touchscreen, button(s), microphone, etc.). In Bluetooth mesh, a device 410 may support more than one element. An element is an entity that will have a unicast address through which other devices in the mesh network can communicate. For example, a mesh-capable four switch extension board will have four elements indicating the four different switches. In another example, one element of a device 410 may support turning a light on or off, and another element may support changing the color of the light.

At 408, the controller 106 sends a Provisioning Start PDU to the device 410 which indicates to the device 410 that the controller 106 does not know the public key of the device 410. At 412 and 414, the controller 106 and the device 410 exchange their public keys in Provisioning Public Key PDUs, either directly (e.g., over their Bluetooth connection) or using an out-of-band method (e.g., the device 410 flashes its LED some number of times and the user enters the number into the user interface of the controller 106). At 416, the controller 106 sends a Provisioning Confirmation Provisioner PDU to the device 410, and at 418, the device 410 sends a Provisioning Confirmation Device PDU to the controller 106 confirming that each device has received the other's public key.

At 420, the controller 106 outputs a random, single or multi-digit number to the user in some form, such as by displaying it on a touchscreen of the controller 106. At 422, the device 410 also outputs a random, single or multi-digit number to the user in some form, using an action appropriate to its capabilities. For example, it might flash its LED the number of times of the random number or beep that number of times. The user enters the number(s) output by the controller 106 and the device 410 into the device 410 and controller 106, respectively, and a cryptographic exchange takes place between the two devices, involving the random number, to complete the authentication of each of the two devices to each other.

include, but not limited to, the information fields in the PREQ message format table listed below.

PREQ Message Format

| Field | Size (bits) | Notes |
|---|---|---|
| On_Behalf_Of_Dependent_Origin | 1 | Transmitted on behalf of a dependent node of the Path Origin |
| Path_Origin_Path_Metric_Type | 3 | Path metric type used to calculate the path metric |
| Path_Origin_Path_Lifetime | 2 | Path lifetime associated with the path |
| Prohibited | 2 | Prohibited |
| Path_Origin_Forwarding_Number | 8 | Forwarding number generated by the Path Origin |
| Path_Origin_Path_Metric | 8 | Path metric associated with the path |
| Destination | 16 | Destination address of the path |
| Path_Origin_Unicast_Addr_Range | variable (16 or 24) | Path Origin unicast address range |
| Dependent_Origin_Unicast_Addr_Range | variable (16 or 24) | Unicast address range of the dependent node of the Path Origin (C.1) |

After authentication has successfully completed, a session key is derived from the ECDH shared secret by each of the two devices from their private keys (e.g., the "DevKey" in Bluetooth mesh) and the exchanged public keys. More specifically, both the controller 106 and the device 410 calculate the ECDH shared secret using their own pair of public keys (exchanged at 412 and 414) and private keys. The ECDH algorithm is used by each device to securely calculate the session key by exchanging public keys, calculating an ECDH shared secret using the public key, and then generating a session key from the common ECDH secret.

At 424, the controller 106 uses the session key to encrypt the subsequent distribution of the data used to complete the provisioning process including a network key (e.g., the "NetKey" in Bluetooth mesh) which is transmitted in a Provisioning Data PDU to the device 410. At 426, upon receipt of the Provisioning Data PDU, the device 410 sends a Provisioning Complete PDU to the controller 106 to complete the provisioning process. After provisioning has completed, the provisioned device 410 possesses the mesh network's NetKey, a mesh security parameter known as the IV Index, and a unicast address for the device 410 allocated by the controller 106. It is now known as a "node" in the mesh network such as a node 102 in wireless mesh network 100.

Figure 5:
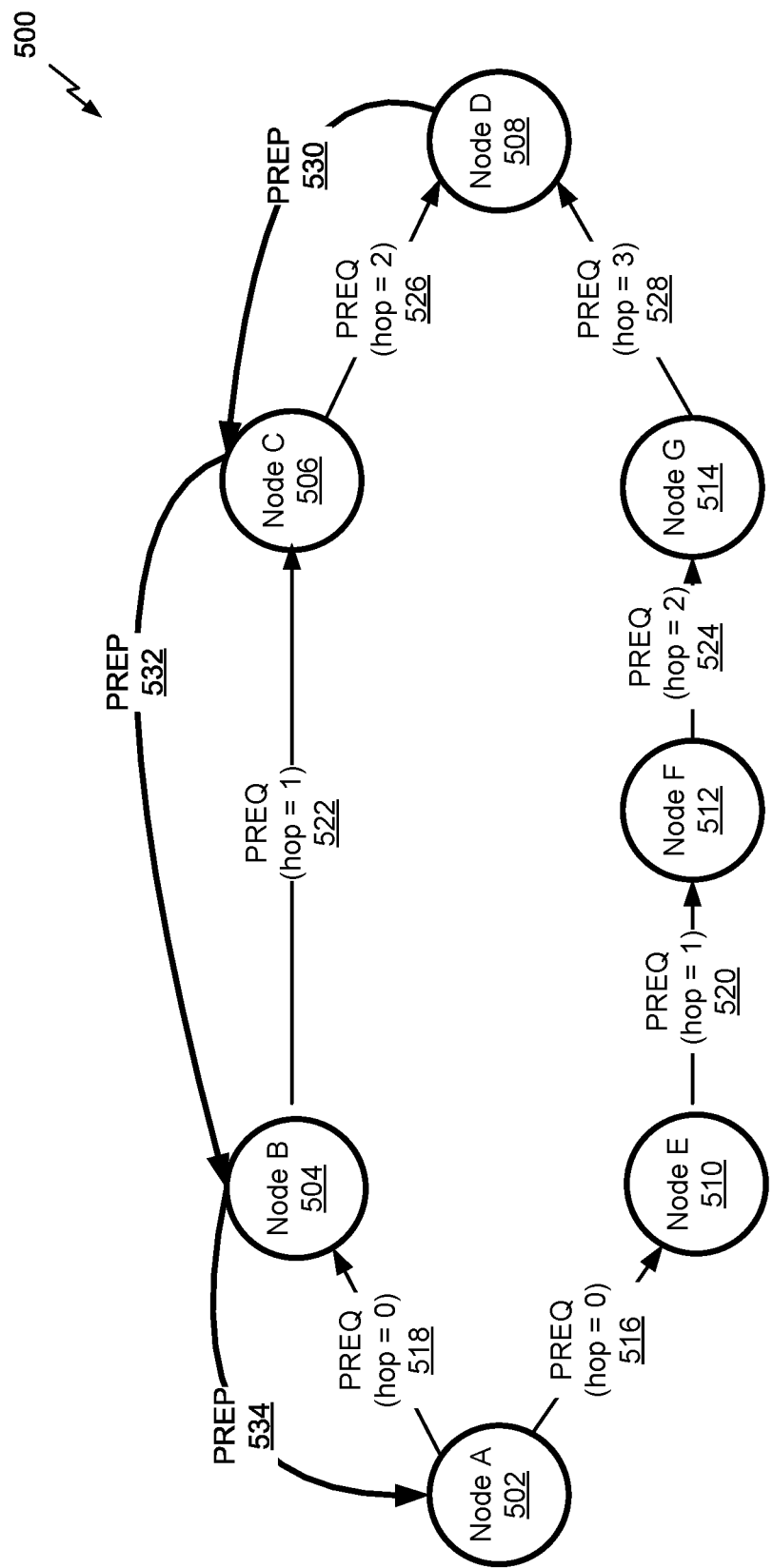
FIG. 5 is a block diagram illustrating one configuration of a path discovery using directed forwarding.

FIG. 5 is a block diagram illustrating one configuration of a path discovery using directed forwarding. In this configuration, the originator node A 502 wants to communicate with node D 508 but does not know an available communication path. For example, one communication path can be originator node A 502 to node B 504 to node C 506 to destination node D 508 and another communication path can be originator node A 502 to node E 510 to node F 512 to node G 514 to destination node D 508.

The originator node A 502 broadcasts via intermediate nodes a PREQ message that includes certain information fields to all the intermediate nodes including node B 504, node C 506, node E 510, node F 512, and node G 514. The PREQ is sent on a fixed group address of ALL DF NODES (0xFFFB). The PREQ message can include any type of information fields, size, format, information type, and related fields. In one example, the PREQ message can The intermediate nodes including node B 504, node C 506, node E 510, node F 512, and node G 514 receive the PREQ message. If any of the intermediate nodes support the path metric POPMT field in the PREQ message, then an intermediate node can process the PREQ message and forward it to another intermediate node. For example, the originator node A 502 sends a PREQ message 518 to node B 504. Node B 504 sends the same PREQ message 522 to node C 506. Node C 506 sends the same PREQ message 526 to destination node D 508. In another example, the originator node A 502 sends a PREQ message 516 to node E 510. Node E 510 sends the same PREQ message 520 to node F 512. Node F 512 sends the same PREQ message 524 to destination node G 514. Node G 514 sends the same PREQ message 528 to destination node D 508.

After an intermediate node forwards the PREQ message, the intermediate node can store the contents of the forwarded PREQ message in a Discovery Table (DT) in its own memory. The intermediate node may store the PREQ message in the Discovery Table so that it can use the same entry in the table if it receives a related PREP message.

When the destination node D 508 receives the PREQ message 526, the destination node D 508 can evaluate which PREQ message is the most efficient by evaluating the path metric field POPMT in each message referred to as a hop count. For example, all the PREQ messages include a hop count as follows: PREQ (hop=0) 516, PREQ (hop=0) 518, PREQ (hop=1) 520, PREQ (hop=1) 522, PREQ (hop=2) 524, PREQ (hop=2) 526, PREQ (hop=3) 528. The hop count is the number of intermediate node paths between the originator node A 502 and the destination node D 508. In this example, the destination node D 508 would select the PREQ (hop=2) 526 at node C 506 since this is the most efficient path to communicate with originator node A 502.

Destination node D 508 will send a PREP message 530 to the selected node C 506. Node C 506 will send the same PREP message 532 to node B 504. Node B 504 will then send the same PREP message 534 to the originator node A 502. At this point, the path becomes established going from originator node A 502 to destination node D 508. The PREP messages 530, 532, & 534 can include any type of information fields, size, format, information type, and related fields. In one example, the PREP messages 530, 532, & 534 include, but not limited to, the information fields in the PREP message format table listed below.

PREP Message Format

| Field | Size (bits) | Notes |
|---|---|---|
| Unicast_Destination | 1 | Flag indicating whether the PATH_REPLY message was transmitted in response to a PATH_REQUEST message with a unicast address in the Destination field |
| On_Behalf_Of_Dependent_Target | 1 | Flag indicating whether the PATH_REPLY message was transmitted on behalf of a dependent node of the Path Target |
| Confirmation_Request | 1 | Confirmation requested |
| Prohibited | 5 | Prohibited |
| Path_Origin | 16 | Primary element address of the Path Origin |
| Path_Origin_Forwarding_Number | 8 | Forwarding number generated by the Path Origin |
| Path_Target_Unicast_Addr_Range | variable (16 or 24) | Path Target unicast address range (C.1) |
| Dependent_Target_Unicast_Addr_Range | variable (16 or 24) | Unicast address range of the dependent node of the Path Target (C.2) |

In the example, the intermediate nodes which get the PREP messages 530 & 532 including node B 504 and node C 506 each make a path entry into their own Forwarding Tables (FT) that are separately stored in their own memory. The path entry can later be referenced by each node when they send and/or forward any messages from the originator node A 502 to the destination node D 508.

Figure 6:
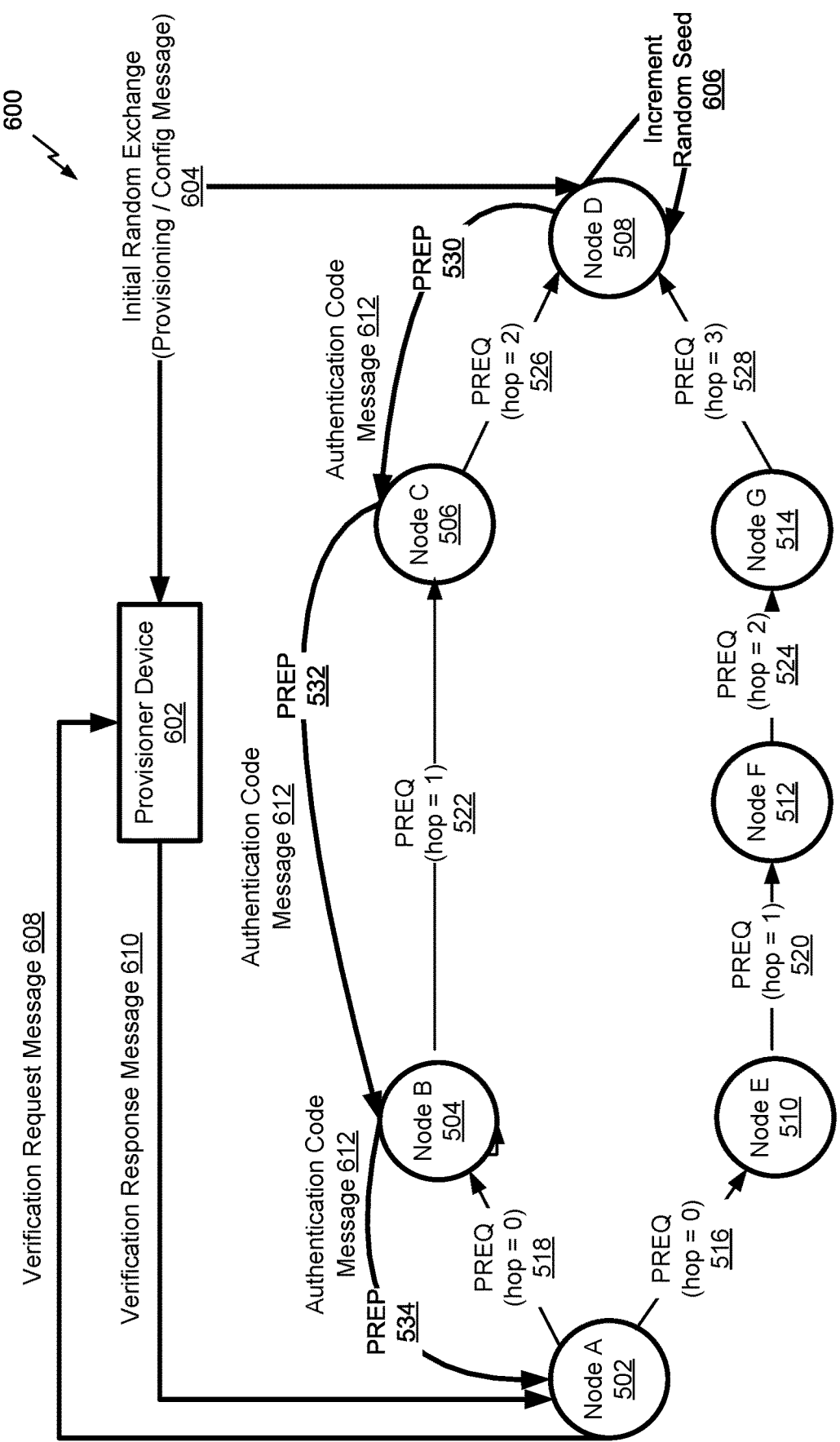
FIG. 6 is a block diagram illustrating one configuration of a secure path discovery using directed forwarding.

FIG. 6 is a block diagram illustrating one configuration of a secure path discovery using directed forwarding. In this configuration, the path discovery process is similar to that described in FIG. 5 except for the addition of an authentication and verification process to determine that the destination node D 508 is not a third party attacker. The authentication and verification process ensures that the originator node A 502 has assurances that the communication path to the destination node D 508 is secure.

For ease of reference, the nodes and path discovery messages are using the same reference numbers used in FIG. 5 as the portion of the underlying path discovery is the same. As shown in FIG. 6, the originator node A 502 wants to communicate with node D 508 and needs to determine the best communication path. The originator node A 502 sends a path discovery request to the destination node D 508 for the destination node D 508 to select a path. In one implementation, the originator node A 502 broadcasts PREQ messages that include certain information fields to all the intermediate nodes including node B 504, node C 506, node E 510, node F 512, and node G 514. The intermediate nodes will forward the same exact PREQ message (516, 518, 520, 522, 524, 526, 528) to each other ending at destination node D 508. In one example, the originator node A 502 will set the POPMT field to (0x02) in the PREQ messages 516 and 518 that it initially sends to node B 504 and node E 510. All intermediate nodes that support this specific POPMT value will forward the PREQ message to the next node until the PREQ message is received by the destination node D 508.

When the destination node D 508 receives the PREQ message 526, the destination node D 508 can evaluate which PREQ message is the most efficient by evaluating the path metric field POPMT in each message referred to as a hop count. In this example, the destination node D 508 would select the PREQ (hop=2) 526 at node C 506 since this is the shortest path to communicate with originator node A 502.

The destination node D 508 can select a path from one or more paths. The destination node D 508 can select a path based on a various criteria, including but not limited to, network metrics, node metrics, node values, hop count, POPMT values, PREQ message values, shortest path, and related metrics and values.

The destination node D 508 will send the selected path to the originator node A 502. In one implementation, the destination node D 508 will send a PREP message 530 to the selected node C 506. Node C 506 will send the same PREP message 532 to node B 504. Node B 504 will then send the same PREP message 534 to the originator node A 502. At this point, the path becomes established going from originator node A 502 to destination node D 508.

The originator node A 502 will wait to send communications to the destination node D 508 until the originator node A 502 receives an authentication code message 612 from the destination node D 508 and the provisioner device 602 has verified the destination node D 508.

Before the destination node D 508 generates an authentication code message 612, the destination node D 508 can communicate with the provisioner device 602. The destination node D 508 can communicate with the provisioner device 602 at any time including before the path discovery process. In one example, the destination node D 508 has not been provisioned on the wireless mesh network. The destination node D 508 communicates with the provisioner device 602 to receive a random seed during an initial random exchange 604 and proceeds through the provisioning process. One example of the provisioning process can be found in FIG. 4. As part of the provisioning process, the destination node D 508 communicates with the provisioner device 602 to receive a random seed during the initial random exchange 604.

The provisioner device 602 can send and/or update the random seed to the destination node D 508 and/or other nodes at any time using several different procedures. In one example, the provisioner device 602 can update the random seed for at least one node on a periodic basis. In another example, the provisioner device 602 sends a new random seed to a node based on a request from the node. In another example, the provisioner device 602 sends a custom configuration message 604 to the destination node D 508 which includes a new random seed when the provisioner device 602 determines that a large portion of the random seed sequences have been used. The random seed can be in any form including alpha, numerical, or alpha numerical. In one example, the random seed is a nonce. The random seed can also be any length. In another example, the random seed is 4 octets (32 bit). In another example, the random seed can also be chosen from 0-64K (LSB 16 bit) to ensure that there is enough range for a node to increment the random seed.

Once the destination node D 508 receives the random seed, the destination node D will increment the value of the random seed 606. In one example, the destination node D can increment the value of the random seed based on each new secure path discovery by the destination device D 508. The destination node D 508 will then generate an authentication code based on the random seed. The authentication code can be generated by several different techniques including encrypted and unencrypted procedures. In one example, the authentication code can be generated by generating an encrypted hash value based on different values including, but not limited to, the random seed, device key of the destination device, and a payload. The authentication code can be in any form including alpha, numerical, or alpha numerical. The authentication code can be any length. In one example, the authentication code is 4 octets.

The destination node D 508 will generate an authentication code message 612 to send to the originator node A 502 which can be encrypted or unencrypted. The authentication code message 612 can include any type of information fields, any type of format, and any length. In one example, the authentication code message 612 includes the authentication code, an AuthMic (authentication message integrity check), and the destination device unicast address. The destination node D 508 will send the authentication code message 612 to node C 506. Node C 506 will then forward the authentication code message 612 to Node B 504. Node B 504 will forward the authentication code message 612 to the originator node A 502.

Once the originator node A 502 receives the authentication code message 612, the originator node A 502 will send a verification request message 608 to the provisioner device 602 to request that the provisioner device 602 verify that that the destination node D 508 is a properly provisioned node and can receive communications. The verification request message 608 can include any type of information fields. In one example, the verification request message 608 will include all of the fields and information from the authentication code message 612 such as the authentication code, an AuthMic, and the destination device unicast address.

The provisioner device 602 will perform a verification of the destination node D 502. The provisioner device 602 can perform the verification using different techniques, calculations, comparisons, threshold, metrics, and/or any values contained in the authentication code message 612. In one implementation, the provisioner device 602 can perform the verification by decrypting the authentication code and determining if the value of the AuthMic sent by the destination node D 508 matches the value of the AuthMic generated by the provisioner device 602. If the AuthMic values match, then the destination node D 502 is verified. If the AuthMic values do not match, then the destination node D 502 fails the verification. In another implementation, the provisioner device 602 can perform the verification by determining if the value of the AuthMic from the authentication code message 612 matches the value of the AuthMic generated by the provisioner device 602.

If the destination node D 508 fails the verification, then the provisioner device 602 will send a verification response message 610 to the originator node A 502 which confirms that the destination node D 508 has failed to be verified. The originator node A 502 can then block the destination node D 508 from receiving any messages from other nodes. The provisioner device 602 can also block the destination node D 508 from receiving any messages from other nodes. At this point, the originator node A 502 can then report to the provisioner device 602 that the destination node D 508 is a third party attacker.

If the destination node D 508 passes the verification, then the provisioner device 602 will send a verification response message 610 to the originator node A 502 which confirms that the destination node D 508 has been verified. At this point, the originator node A 502 can send communications to the destination node D 508. For example, the communications can include data, text, graphics, videos, audio, messages, signals, data packets, and related forms of communications. In another implementation, the originator node A 502 can send a confirmation message to the destination node D 508 confirming that destination node D 508 has been verified. Once the destination node D 508 receives the verification response message 610, the originator node A 502 and the destination node D 508 can start sending communications to each other.

Figure 7:
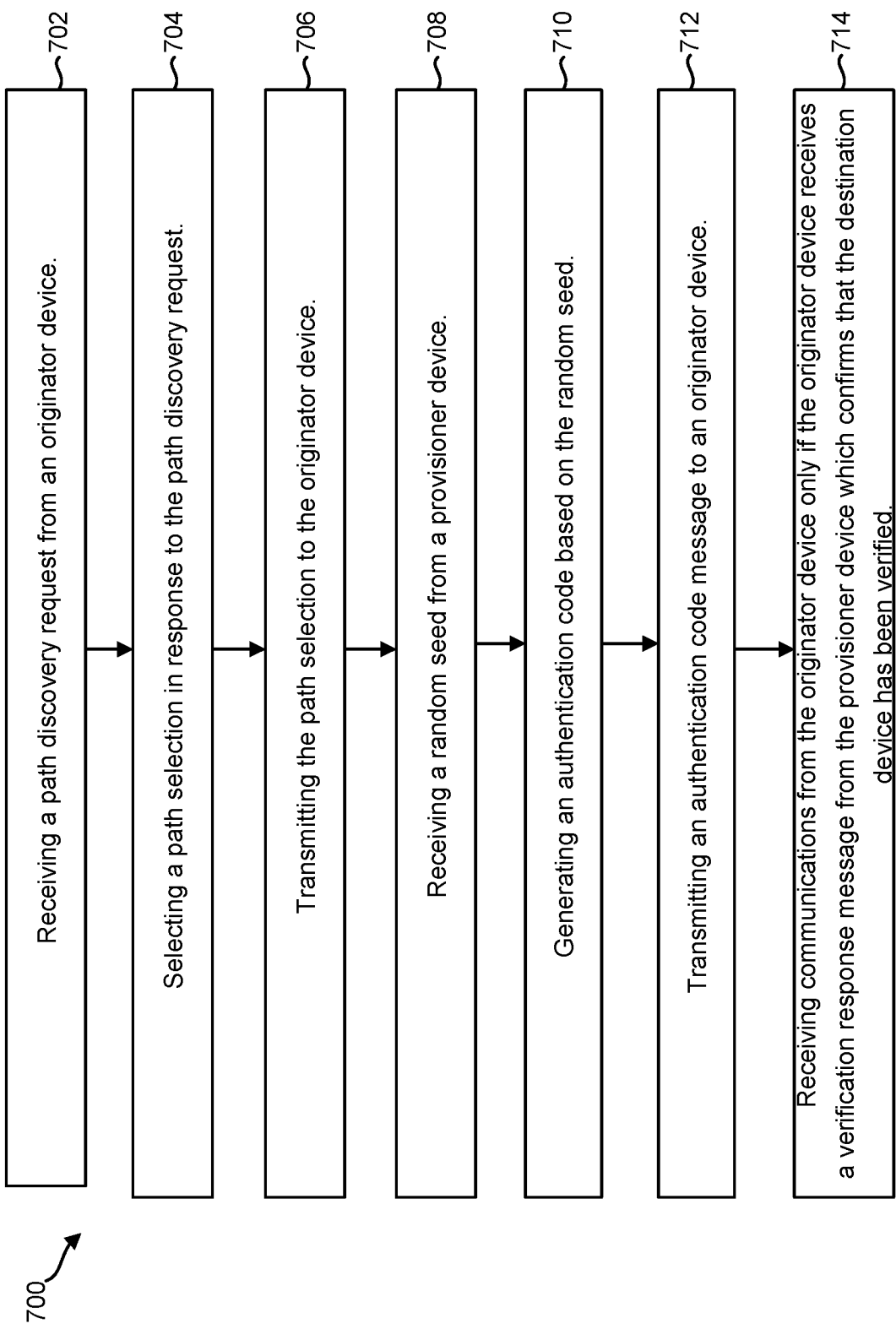
FIG. 7 is a flow diagram illustrating a method for secure path discovery in a mesh network at a destination node.

FIG. 7 is a flow diagram illustrating a method for secure path discovery in a mesh network at a destination device. Referring to FIGS. 5 and 6, this method 700 can be implemented by the originator node A 502, destination node D 508, intermediate nodes (node B 504, node C 506, node E 510, node F 512, and Node G 514), and provisioner device 602.

At step 702, the destination device receives a path discovery request from an originator device. The operations of 702 can be performed according to the methods described herein. In some implementations, the operations of 702 can be performed by the originator node A 502, destination node D 508, intermediate nodes (node B 504, node C 506, node E 510, node F 512, and Node G 514), and provisioner device 602 as described with reference to FIGS. 5 and 6.

At step 704, the destination device selects a path selection in response to the path discovery request. The operations of 704 can be performed according to the methods described herein. In some implementations, the operations of 704 can be performed by the originator node A 502, destination node D 508, intermediate nodes (node B 504, node C 506, node E 510, node F 512, and Node G 514), and provisioner device 602 as described with reference to FIGS. 5 and 6.

At step 706, the destination device transmits the path selection to the originator device. The operations of 706 can be performed according to the methods described herein. In some implementations, the operations of 706 can be performed by the originator node A 502, destination node D 508, intermediate nodes (node B 504, node C 506, node E 510, node F 512, and Node G 514), and provisioner device 602 as described with reference to FIGS. 5 and 6.

At step 708, the destination device receives a random seed from a provisioner device. The operations of 708 can be performed according to the methods described herein. In some implementations, the operations of 708 can be performed by the originator node A 502, destination node D 508, intermediate nodes (node B 504, node C 506, node E 510, node F 512, and Node G 514), and provisioner device 602 as described with reference to FIGS. 5 and 6.

At step 710, the destination device generates an authentication code based on the random seed. The operations of 710 can be performed according to the methods described herein. In some implementations, the operations of 710 can be performed by the originator node A 502, destination node D 508, intermediate nodes (node B 504, node C 506, node E 510, node F 512, and Node G 514), and provisioner device 602 as described with reference to FIGS. 5 and 6.

At step 712, the destination device transmits an authentication code message to an originator device. The operations of 712 can be performed according to the methods described herein. In some implementations, the operations of 712 can be performed by the originator node A 502, destination node D 508, intermediate nodes (node B 504, node C 506, node E 510, node F 512, and Node G 514), and provisioner device 602 as described with reference to FIGS. 5 and 6.

At step 714, the destination device receives communications from the originator device only if the originator device receives a verification response message from the provisioner device which confirms that the destination device has been verified. The operations of 714 can be performed according to the methods described herein. In some implementations, the operations of 714 can be performed by the originator node A 502, destination node D 508, intermediate nodes (node B 504, node C 506, node E 510, node F 512, and Node G 514), and provisioner device 602 as described with reference to FIGS. 5 and 6.

Figure 8:
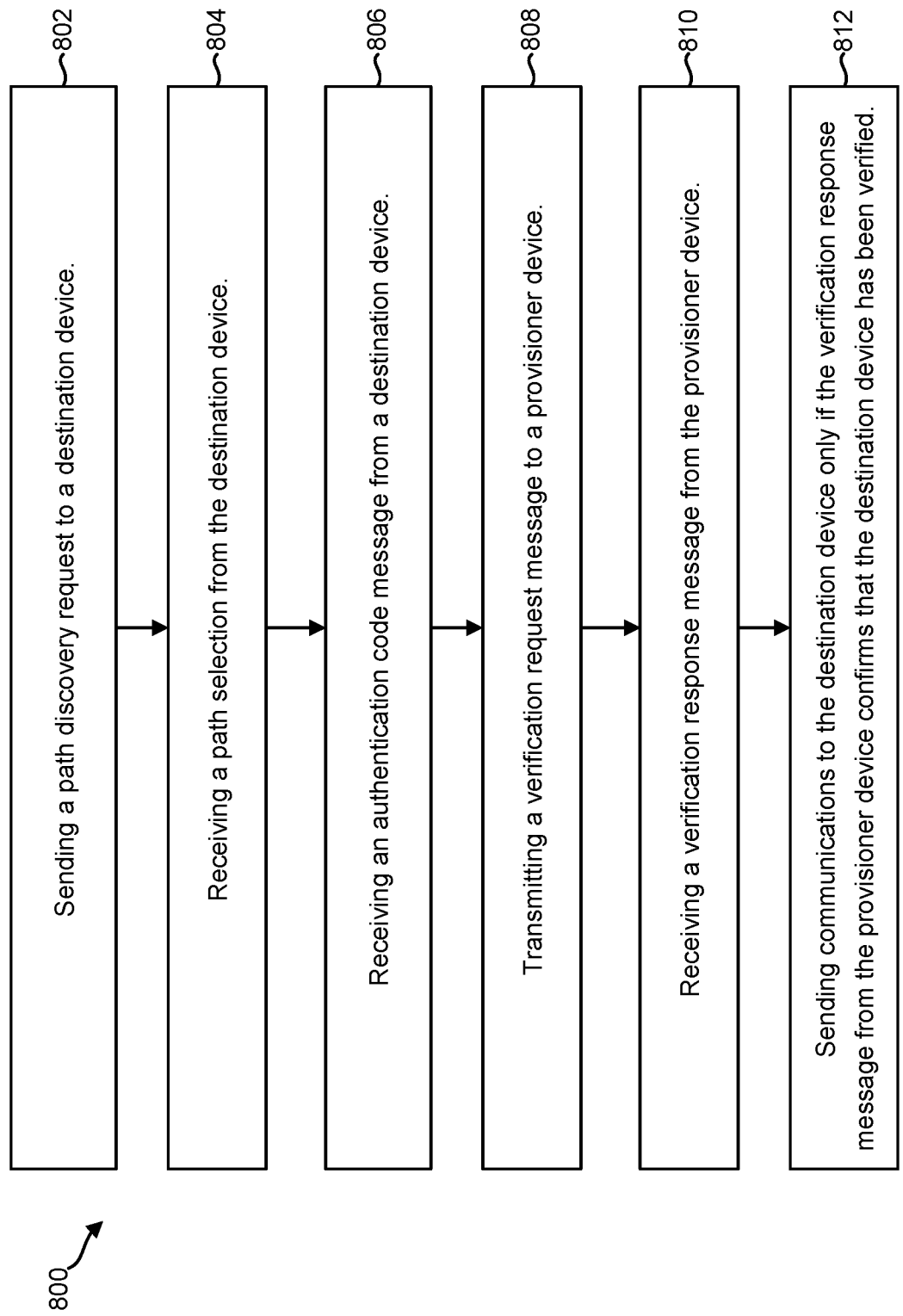
FIG. 8 is a flow diagram illustrating a method for secure path discovery in a mesh network at an originator node.

FIG. 8 is a flow diagram illustrating a method for secure path discovery in a mesh network at an originator device. Referring to FIGS. 5 and 6 this method 800 can be implemented according to the methods described herein. In some implementations, the operations of method 800 can be performed by the originator node A 502, destination node D 508, intermediate nodes (node B 504, node C 506, node E 510, node F 512, and Node G 514), and provisioner device 602 as described with reference to FIGS. 5 and 6.

At step 802, the originator device sends a path discovery request to a destination device. The operations of 802 can be performed according to the methods described herein. In some implementations, the operations of 802 can be performed by the originator node A 502, destination node D 508, intermediate nodes (node B 504, node C 506, node E 510, node F 512, and Node G 514), and provisioner device 602 as described with reference to FIGS. 5 and 6.

At step 804, the originator device receives a path selection from the destination device. The operations of 804 can be performed according to the methods described herein. In some implementations, the operations of 804 can be performed by the originator node A 502, destination node D 508, intermediate nodes (node B 504, node C 506, node E 510, node F 512, and Node G 514), and provisioner device 602 as described with reference to FIGS. 5 and 6.

At step 806, the originator device receives an authentication code message from a destination device. The operations of 806 can be performed according to the methods described herein. In some implementations, the operations of 806 can be performed by the originator node A 502, destination node D 508, intermediate nodes (node B 504, node C 506, node E 510, node F 512, and Node G 514), and provisioner device 602 as described with reference to FIGS. 5 and 6.

At step 808, the originator device transmits a verification request message to a provisioner device. The operations of 808 can be performed according to the methods described herein. In some implementations, the operations of 808 can be performed by the originator node A 502, destination node D 508, intermediate nodes (node B 504, node C 506, node E 510, node F 512, and Node G 514), and provisioner device 602 as described with reference to FIGS. 5 and 6.

At step 810, the originator device receives a verification response message from the provisioner device. The operations of 810 can be performed according to the methods described herein. In some implementations, the operations of 810 can be performed by the originator node A 502, destination node D 508, intermediate nodes (node B 504, node C 506, node E 510, node F 512, and Node G 514), and provisioner device 602 as described with reference to FIGS. 5 and 6.

At step 812, the originator device sends communications to the destination device only if the verification response message from the provisioner device confirms that the destination device has been verified. The operations of 812 can be performed according to the methods described herein. In some implementations, the operations of 812 can be performed by the originator node A 502, destination node D 508, intermediate nodes (node B 504, node C 506, node E 510, node F 512, and Node G 514), and provisioner device 602 as described with reference to FIGS. 5 and 6.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a computer-readable medium embodying a method for establishing an encrypted connection between a first node and a second node in a wireless mesh network.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method for secure path discovery in a mesh network at a destination device, comprising:
   receiving a path discovery request from an originator device;
   selecting a path selection in response to the path discovery request;
   transmitting the path selection to the originator device;
   receiving a random seed from a provisioner device;
   generating an authentication code based on the random seed;
   transmitting an authentication code message to the originator device;
   receiving communications from the originator device only if the originator device receives a verification response message from the provisioner device which confirms that the destination device has been verified; and
   wherein the random seed is incremented on each new secure path discovery by the destination device.

2. The method of claim 1, wherein the random seed is 4 octets.

3. The method of claim 1, wherein the authentication code is 4 octets.

4. The method of claim 1, wherein the provisioner device can update the random seed for at least one device on a periodic basis.

5. The method of claim 1, wherein the provisioner device sends a new random seed to a device based on a request from the device.

6. The method of claim 1, wherein generating the authentication code includes generating an encrypted hash value based on the random seed, device key of the destination device, and a payload.

7. The method of claim 1, wherein the authentication code message includes the authentication code, an AuthMic (authentication message integrity check), and a destination device unicast address.

8. The method of claim 7, wherein the provisioner device performs the verification by decrypting a value of the authentication code and determining if a value of the AuthMic sent by the destination device matches a value of the AuthMic generated by the provisioner device.

9. The method of claim 1, wherein if the verification response message confirms that the destination device has failed to be verified, the originator device blocks the destination device from receiving any communications.

10. The method of claim 9, wherein the originator device reports to the provisioner device that the destination device is a third party attacker.

11. A method for secure path discovery in a mesh network at an originator device, comprising:
    sending a path discovery request to a destination device;
    receiving a path selection from the destination device;
    receiving an authentication code message from the destination device;
    transmitting a verification request message to a provisioner device;
    receiving a verification response message from the provisioner device;
    sending communications to the destination device only if the verification response message from the provisioner device confirms that the destination device has been verified; and
    wherein if the verification response message confirms that the destination device has failed to be verified, the originator device blocks the destination device from receiving any communications.

12. The method of claim 11, wherein the authentication code message includes an authentication code, an AuthMic (authentication message integrity check), and a destination device unicast address.

13. The method of claim 12, wherein generating the authentication code includes generating an encrypted hash value based on a random seed, device key of the destination device, and a payload.

14. The method of claim 12, wherein the provisioner device performs the verification by decrypting a value of the authentication code and determining if a value of the AuthMic sent by the destination device matches a value of the AuthMic generated by the provisioner device.

15. The method of claim 11, wherein the originator device reports to the provisioner device that the destination device is a third party attacker.

16. A destination device for secure path discovery in a mesh network, comprising:
    a memory; and
    at least one processor coupled to the memory and configured to:
       receiving a path discovery request from an originator device;
       selecting a path selection in response to the path discovery request;
       transmitting the path selection to the originator device;
       receiving a random seed from a provisioner device;
       generating an authentication code based on the random seed;

transmitting an authentication code message to the originator device;
receiving communications from the originator device only if the originator device receives a verification response message from the provisioner device which confirms that the destination device has been verified; and
wherein the random seed is incremented on each new secure path discovery by the destination device.

17. The destination device of claim 16, wherein the random seed is 4 octets.

18. The destination device of claim 16, wherein the authentication code is 4 octets.

19. The destination device of claim 16, wherein the provisioner device can update the random seed for at least one device on a periodic basis.

20. The destination device of claim 16, wherein the provisioner device sends a new random seed to a device based on a request from the device.

21. The destination device of claim 16, wherein generating the authentication code includes generating an encrypted hash value based on the random seed, device key of the destination device, and a payload.

22. The destination device of claim 16, wherein the authentication code message includes the authentication code, an AuthMic (authentication message integrity check), and a destination device unicast address.

23. The destination device of claim 16, wherein the provisioner device performs the verification by decrypting a value of the authentication code and determining if a value of the AuthMic sent by the destination device matches a value of the AuthMic generated by the provisioner device.

24. The destination device of claim 16, wherein if the verification response message confirms that the destination device has failed to be verified, the originator device blocks the destination device from receiving any communications.

25. The destination device of claim 24, wherein the originator device reports to the provisioner device that the destination device is a third party attacker.

26. An originator device for secure path discovery in a mesh network, comprising:
a memory; and
at least one processor coupled to the memory and configured to:
sending a path discovery request to a destination device;
receiving a path selection from the destination device;
receiving an authentication code message from the destination device;
transmitting a verification request message to a provisioner device;
receiving a verification response message from the provisioner device;
sending communications to the destination device only if the verification response message from the provisioner device confirms that the destination device has been verified; and
wherein if the verification response message confirms that the destination device has failed to be verified, the originator device blocks the destination device from receiving any communications.

27. The originator device of claim 26, wherein the authentication code message includes an authentication code, an AuthMic (authentication message integrity check), and a destination device unicast address.

28. The originator device of claim 26, wherein generating the authentication code includes generating an encrypted hash value based on a random seed, device key of the destination device, and a payload.

29. The originator device of claim 28, wherein the provisioner device performs the verification by decrypting a value of the authentication code and determining if a value of the AuthMic sent by the destination device matches a value of the AuthMic generated by the provisioner device.

30. The originator device of claim 16, wherein the originator device reports to the provisioner device that the destination device is a third party attacker.

31. A destination device for secure path discovery in a mesh network, comprising:
means for receiving a path discovery request from an originator device;
means for selecting a path selection in response to the path discovery request;
means for transmitting the path selection to the originator device;
means for receiving a random seed from a provisioner device;
means for generating an authentication code based on the random seed;
means for transmitting an authentication code message to the originator device;
means for receiving communications from the originator device only if the originator device receives a verification response message from the provisioner device which confirms that the destination device has been verified; and
wherein the random seed is incremented on each new secure path discovery by the destination device.

32. An originator device for secure path discovery in a mesh network, comprising:
means for sending a path discovery request to a destination device;
means for receiving a path selection from the destination device;
means for receiving an authentication code message from the destination device;
means for transmitting a verification request message to a provisioner device;
means for receiving a verification response message from the provisioner device;
means for sending communications to the destination device only if the verification response message from the provisioner device confirms that the destination device has been verified; and
wherein if the verification response message confirms that the destination device has failed to be verified, the originator device blocks the destination device from receiving any communications.

33. A non-transitory computer-readable medium storing code for secure path discovery at a destination device, the code comprising instructions executable by a processor to:
receiving a path discovery request from an originator device;
selecting a path selection in response to the path discovery request;
transmitting the path selection to the originator device;
receiving a random seed from a provisioner device;
generating an authentication code based on the random seed;
transmitting an authentication code message to an originator device;
receiving communications from the originator device only if the originator device receives a verification response message from the provisioner device which confirms that the destination device has been verified; and wherein the random seed is incremented on each new secure path discovery by the destination device.

34. A non-transitory computer-readable medium storing code for secure path discovery at an originator device, the code comprising instructions executable by a processor to:

sending a path discovery request to a destination device;

receiving a path selection from the destination device;

receiving an authentication code message from the destination device;

transmitting a verification request message to a provisioner device;

receiving a verification response message from the provisioner device;

sending communications to the destination device only if the verification response message from the provisioner device confirms that the destination device has been verified; and wherein if the verification response message confirms that the destination device has failed to be verified, the originator device blocks the destination device from receiving any communications.

* * * * *